(12) United States Patent
Scamardo et al.

(10) Patent No.: US 12,462,244 B1
(45) Date of Patent: Nov. 4, 2025

(54) TRANSACTION CARD SYSTEMS AND METHODS FOR MANAGING TRANSACTION OUTPUTS

(71) Applicant: United Services Automobile Association (USAA), San Antonio, TX (US)

(72) Inventors: Jennifer Anne Scamardo, Frisco, TX (US); Bradford James Kupka, Richardson, TX (US); Brett Andrew Walker, Plano, TX (US); Dwayne Phillip Wilson, Crossroads, TX (US); Patrick Emmanuel Gaston, Frisco, TX (US); Timothy Benjamin Czerlinsky, Dallas, TX (US); Kabita Bhandari, Frisco, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 95 days.

(21) Appl. No.: 17/804,728

(22) Filed: May 31, 2022

(51) Int. Cl.
*G06Q 30/00* (2023.01)
*G06Q 20/34* (2012.01)

(52) U.S. Cl.
CPC .................................. *G06Q 20/34* (2013.01)

(58) Field of Classification Search
CPC ........................................................ G06Q 20/34
USPC ......... 705/39, 1.1, 44, 41, 14.33, 40, 75, 17; 235/380, 472, 492
See application file for complete search history.

(56) References Cited

U.S. PATENT DOCUMENTS

| | | | | |
|---|---|---|---|---|
| 11,783,332 | B2* | 10/2023 | Madan | G06Q 20/401 705/44 |
| 2006/0131393 | A1* | 6/2006 | Cok | G06K 19/077 235/492 |
| 2011/0125637 | A1* | 5/2011 | Kalra | G06Q 40/02 705/40 |
| 2019/0102766 | A1* | 4/2019 | Koeppel | G06Q 30/0222 |

OTHER PUBLICATIONS

ProQuestDialogNPL Search History.*
IP.com NPL Search History.*

* cited by examiner

*Primary Examiner* — John H. Holly
(74) *Attorney, Agent, or Firm* — Fletcher Yoder, P.C.

(57) ABSTRACT

A technique for managing transaction data, such as universal cards to manage transactions or financial goals of a user, and the like, is provided. The transaction data management system may receive an indication of a potential transaction and select a transaction card, such as a credit card, debit card, and the like, for executing the transaction. Further, the transaction data management system may generate a transaction output, which may include cause a display to display a graphical user interface that informs the user of the selected transaction card, recommends a card to sign up for, and/or generates an indication of financial benefits associated with the selected card.

20 Claims, 7 Drawing Sheets

ND SYSTEMS A
TRANSACTION CARD SYSTEMS AND METHODS FOR MANAGING TRANSACTION OUTPUTS

BACKGROUND

The present disclosure relates to techniques for manage transaction data. More specifically, the present disclosure relates to multifunctional or universal transaction cards for executing a transaction and transmitting data associated with a particular card, such as authorization data, associated with selected transaction cards for executing transactions.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A user may own or otherwise manage multiple financial accounts that are each linked to or associated with one or more transaction cards. In general, transaction cards may include credit cards, cash cards, gift cards, and/or debit cards. In any case, the user may use a first transaction card of the cards to execute a purchase or transaction. However, there may be special offerings associated with a second card that is different from the first card the user is using. Accordingly, the user may miss out on certain financial benefits associated with the second card.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, the present disclosure relates to a system. The system includes a processor and communication circuitry in communication with a retail transaction system. The system also includes a tangible, non-transistor, computer readable medium, comprising instructions that cause the processor to receive an indication of a potential transaction from the retail transaction system. The instructions also cause the processor to access stored card data, wherein the stored card data comprises a plurality of stored transaction cards associated with a user. Further, the instructions cause the processor to receive user activity data corresponding to the potential transaction. Even further, the instructions cause the processor to select a transaction card of the plurality of stored transaction cards for executing the potential transaction based on the user activity data. Further still, the instructions cause the processor to generate a transaction output based on the selected transaction card. Further still, the instructions cause the processor to instruct the communication circuitry to communicate the transaction output to the retail transaction system.

In one embodiment, the present disclosure relates to a method. The method includes storing card information for a plurality of cards in a first memory of a transaction card. The method also includes receiving instructions to select an individual card of the plurality of cards. Further, the method includes storing the card information of the selected individual card in a second memory of the transaction card. Even further, the method includes displaying an indication of the selected individual card on a display of the transaction card. Further still, the method includes providing the card information via the second memory at a next transaction.

In one embodiment, the present disclosure relates to a universal transaction card. The universal transaction card comprises a body and a display coupled to the body. The universal transaction card also includes user input device coupled to the body. Further, the universal transaction card includes a memory storing card information for a plurality of cards. Further still, the universal transaction card includes a processor that receives a user input via the user input device to select an individual card of the plurality of cards and generates instructions to use card information of the selected individual card in a next transaction and to display an indication of the selected individual card on the display.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
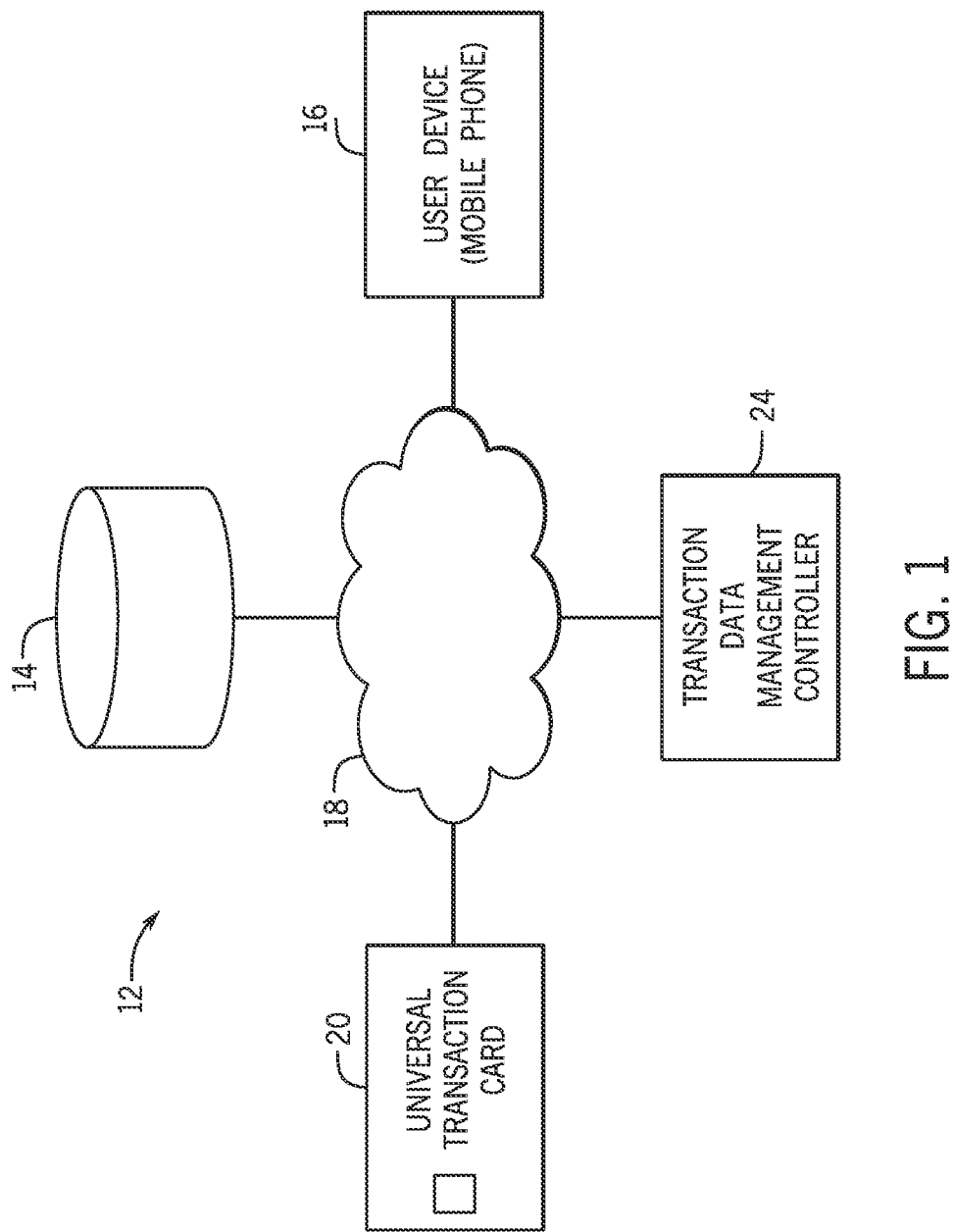
FIG. 1 illustrates a block diagram of a system including a transaction data management system, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, a user may own or manage multiple financial accounts and each financial account may be associated with one or more physical transaction cards (e.g., credit cards, cash cards, gift cards, debits cards) that in turn have associated account information, profile information, etc. Thus, the user has to manage storing and securing multiple physical cards and determining which of these cards is appropriate for particular transactions. In certain cases, a user may have a business lunch that can be charged to a business account card that is used infrequently. In some cases, such infrequently used cards may not be part of the set of cards carried in the user's wallet. Thus, the desired transaction cannot occur when the physical business account card is not present.

Furthermore, it may be desirable to use certain transaction cards instead of others due to special offerings associated with the transaction card and/or account information (e.g., a balance associated with a card). For example, a credit card may offer a "cash back" rewards program for purchases from a particular vendor. In certain instances, such as when a new vendor is added to a list corresponding to the rewards program, a user may not be aware that the new vendor is added to the list. As such, the user may utilize a transaction card other than the credit card that may provide the user financials rewards (e.g., points, miles, cash back, and the like). Additionally, a user may utilize a transaction card and inadvertently incur a financial penalty for using the transaction card associated with a financial account having too few of funds for the transaction and/or spend over a credit limit. Accordingly, it is presently recognized that it may be efficient to develop systems for selecting between multiple transaction cards for executing certain transactions with certain vendors. As discussed in more detail herein, such techniques may provide a financial benefit to a user and improve the efficiency associated with purchasing goods or services (i.e., by pushing or providing authorization data used to execute a purchase)

Accordingly, the present disclosure relates to a transaction data management system for improving the efficiency of transactions and/or providing certain financial benefits to the user. In some embodiments, the transaction data management system may be implemented as a universal physical transaction card and/or a software application that stores and/or is capable of retrieving account information with multiple financial accounts associated with a user. In such embodiments, the transaction data management system may utilize account information (e.g., available balance, interest rates, payment periods, budget information, and the like) to determine or select a particular transaction card for purchasing a good or service. Additionally or alternatively, the disclosed techniques may utilize user activity data (e.g., location information corresponding to the user's current location, a time period corresponding to a potential transaction, and/or a type of good to be purchased) to determine the particular transaction card to purchase the good or service. In any case, the disclosed techniques include generating a transaction output based on the determined transaction card. In general, the transaction output may include causing a graphical user interface (GUI) or other display to display a notification indicating the determined transaction card and/or automatically using the determined transaction card to purchase the good or service (e.g., outputting the authorization information to a terminal used for making the transaction). In this way, the disclosed techniques may improve the efficiency of transactions by preventing a user from using a transaction card when it may be desirable to use another transaction card and/or not make a purchase.

By way of introduction, FIG. 1 is a block diagram of a transaction data management system 12, databases 14, and user computing devices 16, which may be communicatively coupled over a network 18. In some embodiments, the transaction data management system 12 may be implemented using a physical universal transaction card 20. That is, in such embodiments, the physical transaction card 20 may include a smart chip or a transaction chip (e.g., a Europay MasterCard Visa Chip) that is capable of communicating transaction information (e.g., a transaction authorization code) and/or retrieving account information associated with stored card information of one or more cards.

The transaction data management system 12 may be implemented using a controller 24 having a processor that is generally capable of receiving an indication of a potential transaction, determining or selecting a transaction card from stored card information (e.g., stored transaction card information) to use for executing the potential transaction, and transmitting a transaction output based on the selected or determined transaction card.

At least in some instances, the account information may be stored in database 14 that is accessible by the controller 24. As such, the transaction data management system 12 may query the databases 14 or other storage component based on the data to retrieve additional data to generate a transaction output. For example, the databases 14 may be associated with one or more financial institutions.

| Keeping the foregoing in mind, the transaction data management system 12 may assist a user in a number of scenarios. For example, a user entering a store wishing to pay for a good or service may attempt to pay using a first transaction card. However, a processor of the transaction data management system 12 may retrieve account information associated with one or more financial institution and determine that a particular financial institution is providing bonus financial rewards if the user uses a particular transaction card. As such, the processor may cause a display of a device associated with the user to display a notification indicating the particular transaction card. For example, if a user is attempting to use a transaction software, such as APPLE PAY, the processor may cause the display to display a notification indicating the particular transaction card. For example, the processor may cause a display to provide one or more selectable features (e.g., buttons) that enable a user to provide input indicating whether to proceed with purchasing the good with a first transaction card or the transaction card associated with the bonus financial rewards. In some embodiments, the processor may transmit the notification using a text message, email, or other software application having a messaging platform.

As another non-limiting example, the transaction data management system 12 may be capable of managing the budget of a user. For example, the transaction data management system 12 may retrieve account information associated with one or more financial institutions, such as a bank that manages a checking account associated with the user, and a bank that manage a credit card account associated with the user. Furthermore, the transaction data management system 12 may receive user spending data (i.e., one or more previous transactions) and/or user spending habit data (i.e., a frequency and/or amount the user may spend during certain time periods). As such, the transaction data management system 12 may determine that, based on an availability of funds in the check account, that it may not be desirable for the user to purchase a particular good or service. Accordingly, the transaction data management system 12 may cause a display of a user device to display a notification informing the user of the availability of funds, and thus prevent the user from purchasing the good. At least in some instances, the transaction data management system 12 may determine a goal for the user. Furthermore, the transaction data management system 12 may provide certain incentives to prevent the user from making additional purchases until the goal is achieved. In general, the goal may include a spending threshold (i.e., indicating that the user should not spend over an amount), a financial saving goal, and/or a date corresponding to when a credit card statement is released, and thus, potentially a pay-off of a purchase for another time period (e.g., the following credit card statement).

Figure 2:
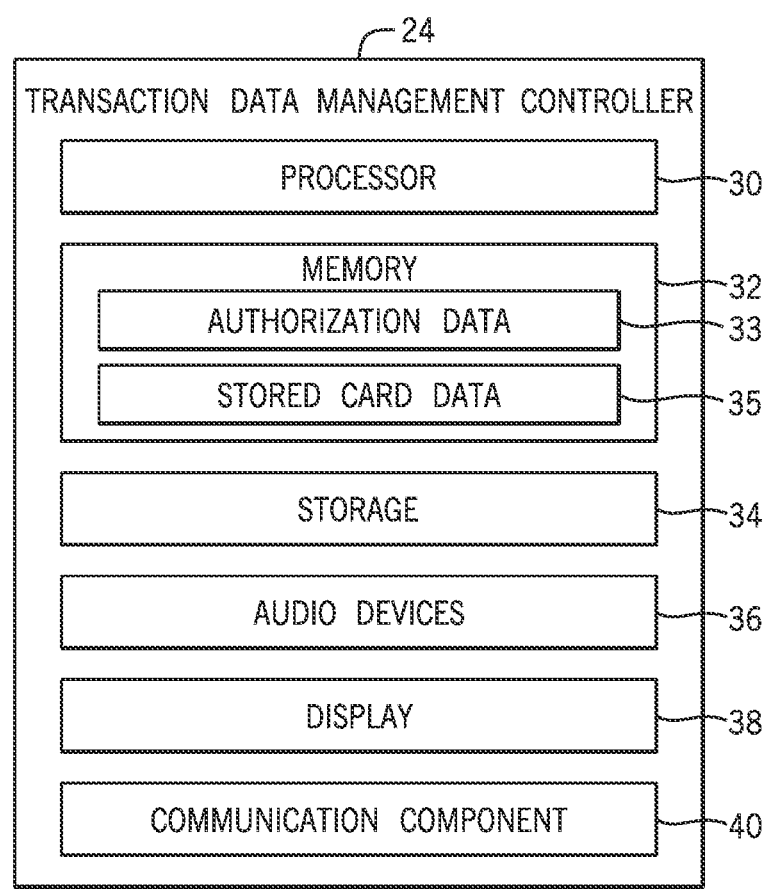
FIG. 2 illustrates a block diagram of a computing system that may be used in conjunction with the system of FIG. 1, in accordance with embodiments described herein.

To perform one or more operations described herein, the transaction data management system 12 may include various types of components that may assist the transaction data management system 12 in performing the operations described below. For example, as shown in FIG. 2, the transaction data management controller 24 may include a processor 30, a memory 32 and/or storage 34, audio devices 36, a display 38 and a communication component 40.

The processor 30 may be any type of computer processor or microprocessor capable of executing computer-executable code. The processor 30 may also include multiple processors that may perform the operations described below. The communication component 40 may be a wireless or wired communication component that may facilitate communication between various components of the transaction data management system 12 such as the databases 14, the user device 16, and various other computing systems via the network 18, the Internet, or the like.

The memory 32 and the storage 34 may be any suitable articles of manufacture that can serve as media to store processor-executable code, data, or the like. These articles of manufacture may represent computer-readable media (e.g., any suitable form of memory or storage) that may store the processor-executable code used by the processor 30 to perform the presently disclosed techniques. As used herein, applications may include any suitable computer software or program that may be installed onto the transaction data management system 12 and executed by the processor 30. The memory 32 and the storage 34 may represent non-transitory computer-readable media (e.g., any suitable form of memory or storage) that may store the processor-executable code used by the processor 30 to perform various techniques described herein. It should be noted that non-transitory merely indicates that the media is tangible and not a signal. As illustrated, the memory 32 stores authorization data 33 and stored card data 35. As described herein, the authorization data 33 may include a transaction code for authorizing a purchase via a terminal device. As described herein, the stored card data 35 may generally include data indicating stored transaction cards associated with a user (e.g., a person, a family, or an enterprise).

Figure 3:
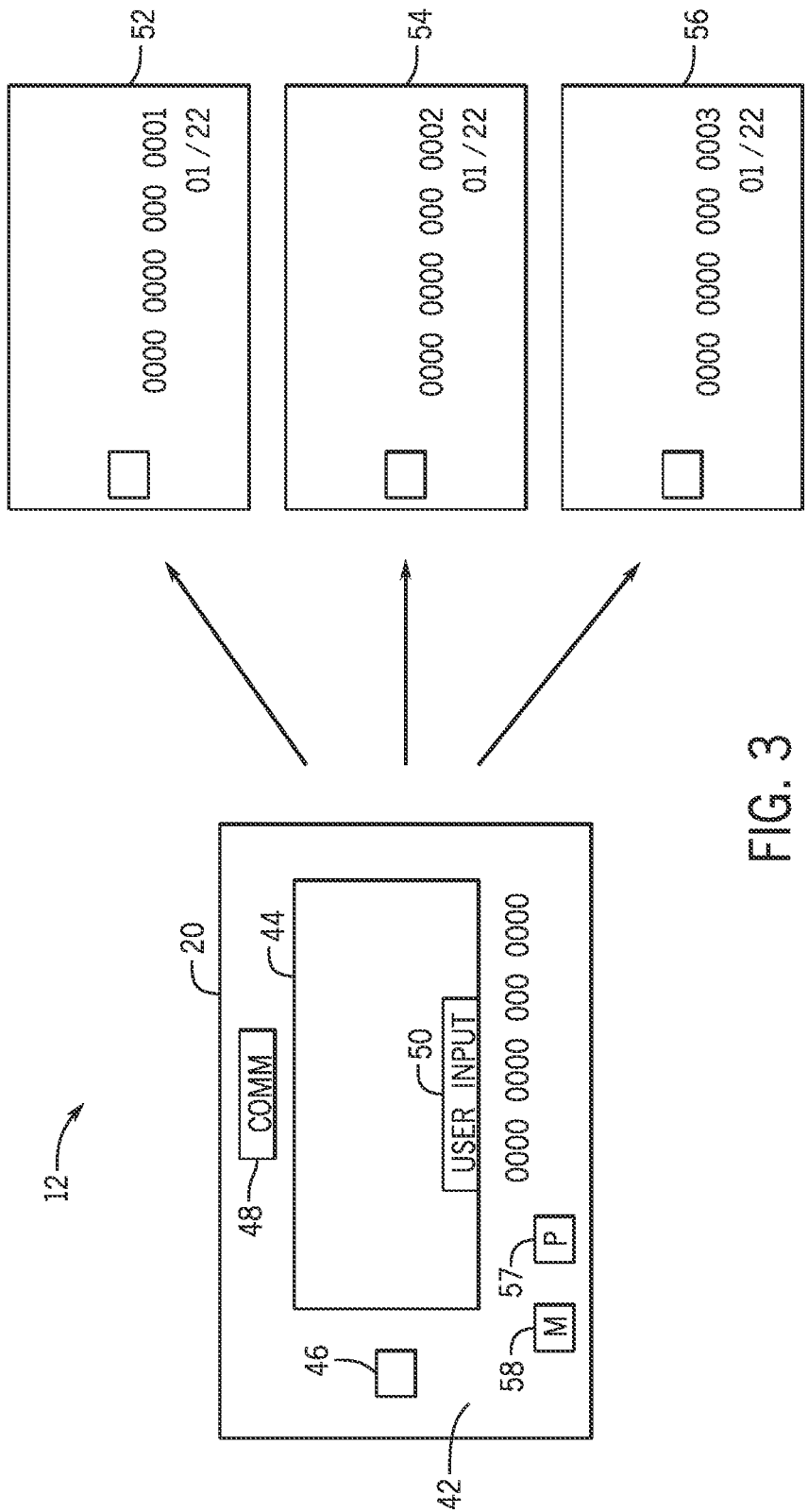
FIG. 3 illustrates a schematic diagram of the transaction data management system of FIG. 1, in accordance with embodiments described herein.

In some embodiments, when the controller is implemented as part of the universal card 20, the processor 30, the memory 32, and/or the storage 34 may be implemented as part of a smart chip (e.g., smart chip 46, see FIG. 3). For example, the smart chip may be an embedded chips, such as a Europay, Mastercard, and Visa (EMV) chip. As such, the memory 32 may store account information and/or transaction data, and the processor 30 may communicate with terminal devices to receive indications of potential actions and/or communicate transaction data and/or authorization data with the terminal devices to facilitate the transaction.

The audio devices 36 may include microphones or other audio input devices capable of receiving verbal queries or commands from a user. For example, the verbal queries may be directed to identifying a queries regarding a particular transaction card to use, such as 'are there funds available on card X', 'are there any special offers for card Y?'

The display 38 may depict visualizations associated with software or executable code being processed by the processor 30. In one embodiment, the display 38 may be a touch display capable of receiving inputs from a user of the transaction data management system 12. The display 28 may be any suitable type of display, such as a liquid crystal display (LCD), plasma display, or an organic light emitting diode (OLED) display, for example. Additionally, in one embodiment, the display 28 may be provided in conjunction with a touch-sensitive mechanism (e.g., a touch screen) that may function as part of a control interface for the transaction data management system 12.

In addition to the transaction data management system 12, the user computing device 16, as well as other suitable computing devices described herein may include the components described above for the transaction data management system 12. It should be noted that the components described above with regard to the transaction data management system 12 are exemplary components and the transaction data management system 12 may include additional or fewer components than shown.

The controller 24 or other components of the system 12 may include one or more computing devices of any suitable type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to a suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by special purpose logic circuitry, e.g., an FPGA (field programmable gate array), an ASIC (application specific integrated circuit), or the like. Further, apparatuses may also be employed to implement disclosed processes and logic flows in accordance with present embodiments.

Processors suitable for the execution of a computer program include, by way of example, both general and special purpose microprocessors, and/or processor(s) of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI (user interface) or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Included in the system is a user computing device 16 from which the initial query regarding one or more financial accounts may be submitted. Additionally, the user computing device 16 may be used for displaying notifications and/or alerts generated by the transaction data management system 12. The user computing device 16 may be a general-purpose personal computer, a laptop computer, a tablet computer, a mobile computer, a mobile device (e.g., cell phone), etc. The transaction data management system 12 may be in communication with the user computing device 16 and configured to receive the initial query via an interface of the user computing device 16.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

FIG. 3 shows a schematic diagram illustrating an example universal transaction card 20 of the transaction data management system 12. In this illustrated embodiment, the transaction data management system 12 includes a universal physical financial transaction card 20, e.g., physical transaction card, a credit card, a debit card, or rewards card, that is multifunctional and can be linked to a number of user accounts to be used instead of existing single-account cards. In general, the physical credit card 20 includes a body 42 formed of a metal material, plastic material, or other suitable material for housing the component described in more detail below. Certain components of the system 12 discussed with respect to FIGS. 1-2 may additionally or alternatively be present on the transaction card 20. For example, the transaction card 20 may include a processor, memory, display, etc., and portions of the discussed with respect to these elements may also apply to similar elements that may additionally or alternatively be present on the transaction card 20.

In the illustrated embodiment, the universal transaction card 20 includes an on-board display 44, a smart chip 46, and a communications component 48. For example, the on-board display 44 may be coupled to, e.g., disposed on or in, the body 42. In the illustrated embodiment, the universal transaction card 20 also includes a user input 50, shown as a selectable key on the display 44. However, the user input 50 may be a button or switch coupled to the body 42. As discussed herein, the user input 50 may receive user selections to select a particular transaction card of the stored transaction cards. The user selection can trigger activity on-board the universal transaction card to change a displayed image, activate a haptic feedback, change stored settings, or transmit a communication based on the selection.

As described herein, the transaction data management system 12 be capable of communicating (e.g. receiving, retrieving, or transmitting) account information and/or authorization data associated with multiple transaction cards. As illustrated, the transaction data management system 12 links, pairs, or otherwise associates the universal transaction card 20 with a first transaction card 52, a second transaction card 54, and a third transaction card 56. As such, the smart chip 32 may store accounts information associated with the first transaction card 52, the second transaction card 54, and the third transaction card 56. Furthermore, the smart chip 32 maybe capable of retrieving such information from each of these transaction cards (e.g., the first transaction card 52, the second transaction card 54, and the third transaction card 56). Moreover, as described herein, the transaction data management system 12 may be capable of outputting transaction data associated with one of these transaction cards during a transaction (e.g. the smart chip 46 and a terminal).

The display 44 may generally display information, notifications, and/or alerts related to first transaction card 52, the second transaction card 54, and/or the third transaction card 56. That is, the processor 30 (not shown) of the transaction data management controller 24 may be capable of causing the display 44 to display the notifications and/or alerts based on the operations described herein. For example, if the processor 30 determines that a particular card is used with a particular transaction, the processor 30 may cause the display 44 (and/or the display 38) to display a notification indicating the particular transaction card. In general, the notification may include information that may identify the associated transaction card to the user, such as the picture displayed on the physical transaction card of one of the first transaction card 52, the second transaction card 54, and the third transaction card 56. In some embodiments the information may include the name of the financial institution associated with one of first transaction card 52, the second transaction card 54, and the third transaction card 56. In this way, the display 44 may inform a user of a transactions associated with an individual transaction card.

Certain functionality of the controller 24 may be at least in part implemented on the universal transaction card 20, and the universal transaction car may include a processor 57 and a memory 58. Further, a processor and memory may additionally or alternatively be present on the smart chip 46. In general, the smart chip is an electronic device having a processor and memory and capable of executing certain software for facilitating purchase transactions as described herein. For example, the smart chip may include an EMV chip.

In an embodiment, the universal transaction card 20 operates in conjunction with its on-board hardware components and to communicate with components of the system 12. For example, a user can select a particular transaction card, e.g., the first transaction card 52. The selection can be mediated via the on-board user input 50. In one example, the user can scroll through available cards with card information stored in a memory of the universal transaction card 20 to select the desired transaction card.

Once selected, the memory settings of the universal transaction card 20 can be updated to reflect the selected card information. Thus, when the universal transaction card 20 is read at a retail point of service location, the selected card information is provided to the reader and the retail transaction is associated with the selected first transaction card 52. In a specific example, the selection of the particular transaction card causes the selection to be communicated to the controller 24 of the system 12. For example, the communication may be mediated by onboard communication circuitry 48, which can either wirelessly communicate with the controller via a network 18 or transmit a communication to a nearby device, such as a user mobile device or a retail point of service reader having receivers. The receiving device can pass the communication along to the controller 24.

In another embodiment, the card selection can be made via a user device 16, e.g., a mobile device, operating a software application in communication with the system 12. Once selected, a communication is transmitted to the controller 24, which in turn generates instructions to cause the universal card 20 to update.

The selection of a particular card can cause an update of memory settings on the universal card 20 and cause a display on the display 44 indicative of the selected card. Further, when the universal transaction card 20 is used at a retail point of sale, the selected card information, and not other card information, is communicated to a retail point of sale device by the universal transaction card 20.

In one embodiment, selection of a particular card triggers generation of an issuer script that is provided by the controller 24. The selection is communicated to the controller 24 as discussed. Reading of the card 20 at a subsequent transaction by a retail point of sale reader cause the issuer script to be communicated and applied. In one embodiment, the issuer script causes the card 20 to update to the selected individual card, e.g., the first card 52. For example, the smart chip 46 can be reset or rewritten, and a previously stored card can be removed from a selected card folder. In one embodiment, the memory 58 on the card 20 stores all associated card information, but the memory of the smart chip 46 only stores a selected card so that only the selected card is read at a retail point of sale.

Figure 4:
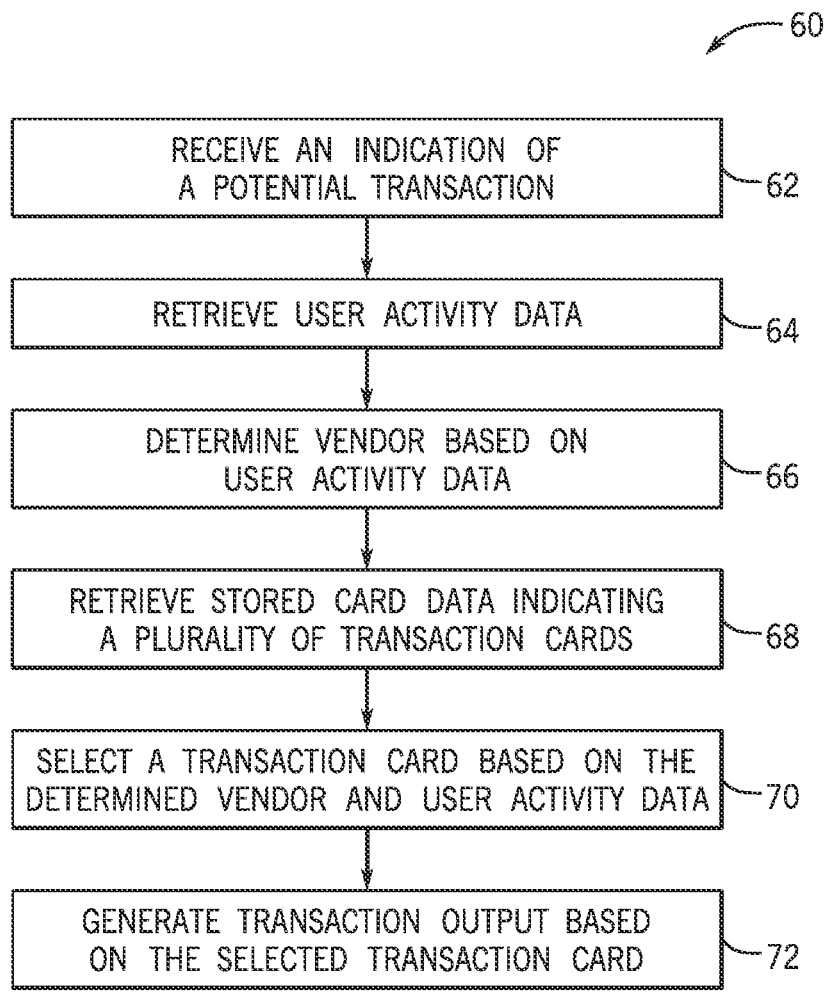
FIG. 4 illustrates a flow diagram for generating a transaction data output, in accordance with embodiments described herein.
Figure 5:
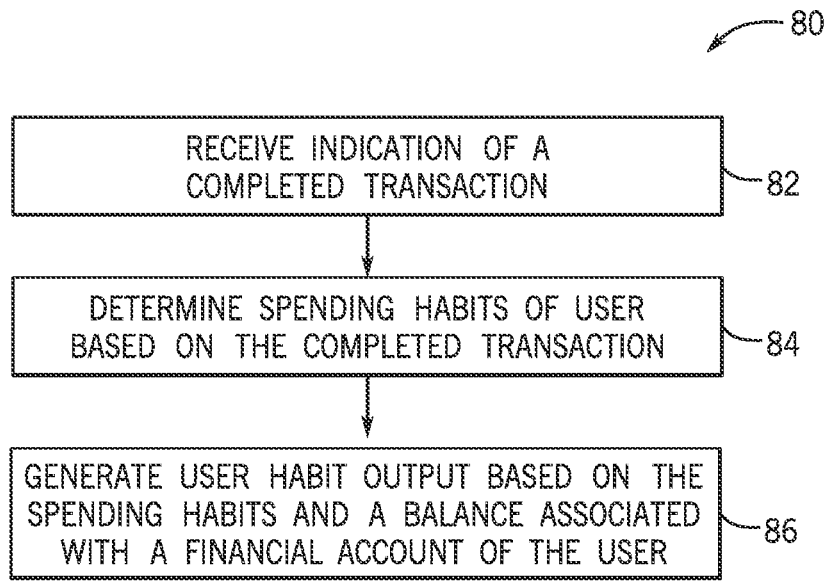
FIG. 5 illustrates a flow diagram for generating a user habit output, in accordance with embodiments described herein.
Figure 6:
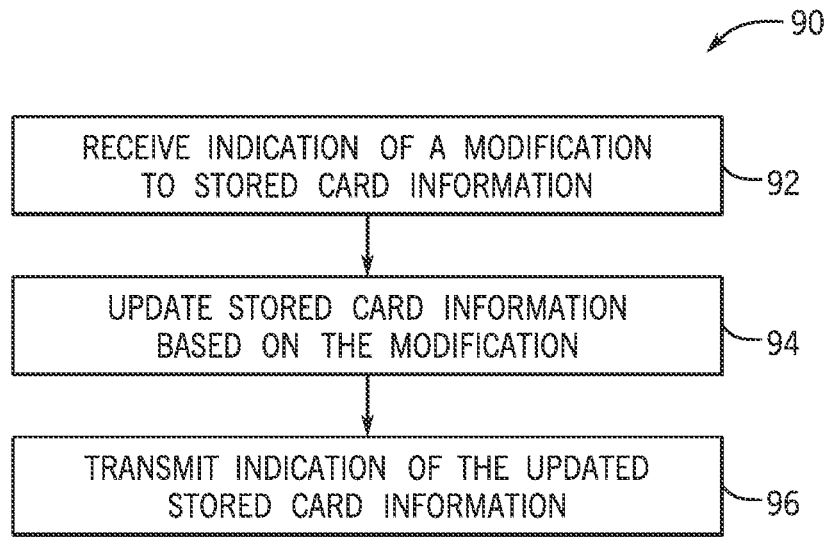
FIG. 6 illustrates a flow diagram for updating stored card information, in accordance with embodiments described herein.

With the foregoing in mind, FIGS. 4-6 illustrate flow diagrams of methods that may be performed by the processor 20 of the transaction data management system 12, for example, to aid users in various scenarios relating to managing the transaction data management system 12.

FIG. 4 illustrates an example process 60 that may be employed by the processor 30 of the transaction data management system 12, in accordance with embodiments described herein. For example, the steps of the process 60 may be stored in the memory 32, the storage 34 and/or the memory 58. Before proceeding, it should be noted that the process 60 described below is described as being performed by the processor 30 of the transaction data management system 12, but the process 60 may be performed by other suitable computing devices. Although described in a particular order, which represents a particular embodiment, it should be noted that the process 60 may be performed in any suitable order. Additionally, embodiments of the process 60 may omit process blocks and/or include additional process blocks.

Referring now to FIG. 4, at block 62, the processor 30 receives an indication of a potential transaction. In general, the indication may be data transmitted from a terminal and/or the processor 30 detecting a nearby terminal. For example, the processor 30 of the transaction data management system 12 may receive the indication in response to the transaction data management system 12 (e.g. in an embodiment where the transaction data management system 12 includes the universal transaction card 20) or a device utilizing the transaction data management system 12 (e.g., in an embodiment where the transaction data management system 12 is implemented as a software application running on a user device 16).

At block 64, the processor 30 receives user activity data. In general, the user activity data includes data that may the processor 30 may use to determine what credit card to use on behalf of the user. For example, the user activity data may include time data indicating a time period corresponding to the potential transaction. For example, the time data may indicate a certain day of the week (e.g., 'Monday', 'Tuesday', or other days of the week) and/or a calendar date (e.g., the $24^{th}$ of December) corresponding to the potential transaction. As another non-limiting example, the time data may indicate a current time corresponding to the potential transaction (e.g., a purchase at 6:00 am). As another non-limiting example, the user activity data may include location data, such as GPS coordinates, a WiFi being utilized by a user device, an IP address, and the like, that indicate a location of the user corresponding to the potential transaction was received, which may indicate a store corresponding to the received indication of the potential transaction.

In some embodiments, the processor may also receive user habit data (e.g. historical data). In general the user habit data may include generally similar data as the user activity data. However, the user habit data generally includes trends and/or correlations determined by the processor 30 relating to a vendor corresponding to previous transactions and at least one of time data and/or location data. For example, the user habit data may indicate a correlation between a first vendor (e.g. a coffee shop) and a time range (e.g. between 7 AM to 9 AM).

At block 66, the processor determines a vendor corresponding to the received indication of the potential transaction. In general, the processor 30 may utilize the user activity data and/or user habit data to determine the vendor associated with the potential transaction. For example, and continuing with one of the examples described above, the processor 30 may receive user activity data indicating a time (e.g., a time stamp) corresponding to when the indication of the potential transaction was received. As such, the processor 30 may compare the time to user habit data indicating one or more time ranges corresponding to certain vendors. As such, if the time corresponding to the potential transaction is within a time range correlated to purchases with a particular vendor, the processor 30 may determine that the potential transaction involves the particular vendor.

At block 70, the processor 30 selects a transaction card based on the determined vendor, user habit data, account information, or any combination thereof. In general, the processor 30 may select or determine a transaction card for executing the potential transaction by selecting a transaction card that provides a financial benefit to the user. For example, the processor 30, at block 66, may determine that the potential transaction is associated with a particular vendor that may offer a rewards card (e.g. a department store, an airlines, restaurant and the like). As such, the processor 30 may access stored card data associated with the user (e.g. stored in the memory of the smart chip 46 and/or stored in the database 14) and determine whether the stored card data includes the rewards card. In general, the "stored card data" may include data indicating the transaction cards associated with the user, such as transaction cards the user has added and/or a default card. For example, the stored card data may include a listing of each of the transaction cards, the type of transaction card (e.g., debit card or credit card, Visa Card, MasterCard, and the like), a vendor associated with the card (e.g., a rewards card for a particular restaurant, department store, airlines, and the like). Accordingly, if the stored card data includes a rewards card, the processor 30 may select the rewards card.

At block 68, the processor 30 retrieves stored card data indicating a plurality of transaction cards associated with the user. In general, the stored card data may include a listing of the plurality of transaction cards, information associated with the transaction cards (e.g., a vendor associated with the transaction card, a transaction card type, an expiration data and the like), and account information associated with the plurality of transaction cards and/or financial accounts of the user (e.g., account balances, income data, spending reports, and the like). For example, the processor 30 may access account information associated with one or more transaction cards of the stored card data. That is, the processor 30 may determine certain fiscal considerations associated with the one or more transaction cards, such as an available balance, the end of a pay period, and the like. Accordingly, the processor may select the transaction card having available balance that is below a threshold (e.g. a budget threshold) and/or the transaction card for which a statement period has more recently ended. As another non-limiting example, the processor 30 may access the account information associated with the one or more transaction cards of the stored card data to determine whether there are any special offerings (e.g., sales, increased rewards points and the like) associated with any of the one or more transaction cards and/or corresponding to the time period the potential transaction. Accordingly, the processor 30 may select the transaction card that provides the largest financial benefit to the user. In an instance where multiple cards may have special offerings, the processor 30 may compare the financial benefits provided by the cards, and thus select the transaction card that provides the largest financial benefit to the user.

In some embodiments, the processor 30 may select the card based on certain user habits or potential purchases the user is likely to make. For example, the processor 30 may determine that a user is likely to take a vacation (e.g., based on an internet search history associated with the user device 16). As such, the processor 30 may select the transaction card that provides a particular type of reward points (e.g., miles).

As described above, the processor may determine whether the stored card data includes a particular rewards card associated with a vendor. In certain embodiments, the processor 30 may determine that the stored card data does not include the particular rewards card. As such, the processor 30 may cause a display of the user device 16 that recommends the user to sign up for a particular transaction card. In some embodiments, the processor 30 may open a web browser to a webpage associated with signing up for the particular transaction card.

A block 72, the processor 30 generates a transaction output based on the selected card. In some embodiments, the transaction output may include the authorization data and/or transaction code to be utilized by the terminal to facilitate the transaction indicated at block 62. That is, the processor 30 may be capable of automatically executing a transaction with a selected card. In some embodiments, the transaction output may include the processor 30 causing a display to display a graphical user interface having a notification that generally indicates a selected transaction card. For example, the notification may include a recommendation for the user to utilize a specific card and/or sign up for a specific card. Furthermore the notification may include additional information that may help the user decide whether or not to use the selected card, such as a list of the financial benefits for the particular card or a comparison of the financial benefits associated with one or more additional cards associated with the stored card data.

Accordingly, the process 60 provides techniques for selecting a transaction card for executing a potential transaction based on user activity data, user habit data, account information associated with stored card data, or any combination thereof. In this way, the process 60 may provide improved financial benefits to the user.

FIG. 5 illustrates an example process 80 that may be employed by the processor 30 of the transaction data management system 12 to determine user spending habits and helping the user manage budget with little input from the user. For example, the steps of the process 70 may be stored in the memory 32, the storage 34 and/or the memory 58. Before proceeding, it should be noted that the process 70 described below is described as being performed by the processor 30 of the transaction data management system 12, but the process 80 may be performed by other suitable computing devices. Although described in a particular order, which represents a particular embodiment, it should be noted that the process 80 may be performed in any suitable order. Additionally, embodiments of the process 80 may omit process blocks and/or include additional process blocks.

Referring now to FIG. 5, at block 82, the processor 30 receives an indication of a completed transaction. In general, the indication of the completed transaction may include a value of funds used for the completed transaction. Additionally, the indication may include data indicating a vendor corresponding to the purchase (i.e., the brand of the good, a store that sold the good, and the like), data indicating a type of good or service purchased, location data corresponding to the purchase, time data corresponding to the purchase, or any combination thereof.

At block 84, the processor 30 determines spending habits of the user based on the completed transaction. In general, the processor 30 may identify correlations between the vendor and data relating to the purchase, such as the location data corresponding to the purchase, time data corresponding to the purchase, or any combination thereof. Furthermore, the processor 30 may access account information associated with one or more transaction cards of the stored card information. As such, the processor 30 may determine whether the user should alter certain spending habits (i.e., if the user's balance is higher than a threshold spending or higher than an amount of income being added to the user's bank account). As such, if the processor 30 determines that the user is spending more money than is being added to the user's account, the processor 30 may cause a display to display a notification indicating an alert or goal for the user.

At block 86, the processor 30 generates a user habit output based on the determined spending habits. For example, the user habit output may cause a display of the user device 16 to display a goal for the user. Accordingly, the process 70 may aid a user in managing their financial accounts by generating financial goals for the user based on determined spending habits.

Figure 7:
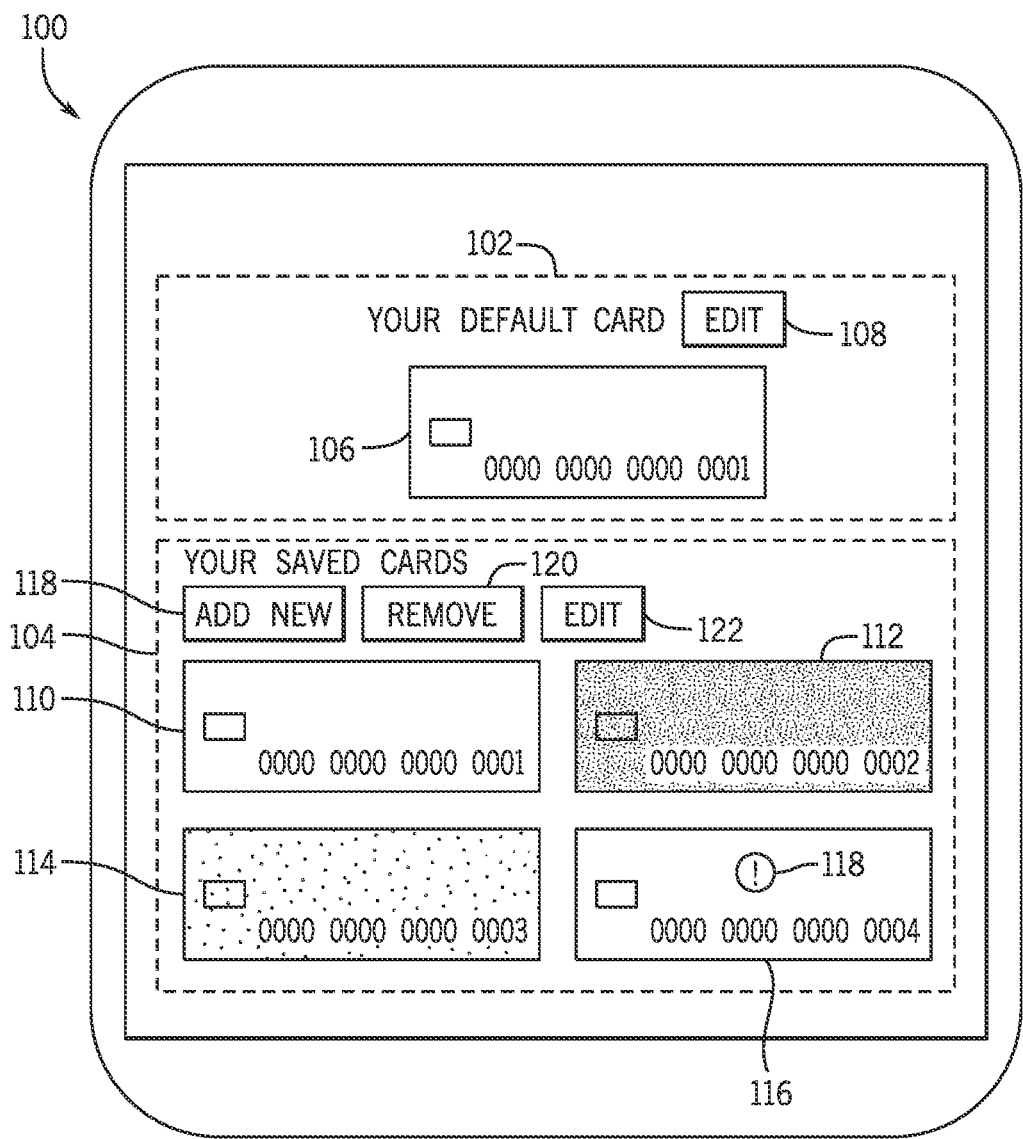
FIG. 7 illustrates a screenshot of a graphical user interface for managing the system of FIG. 1, in accordance with embodiments described herein.

FIG. 7 illustrates an example process 90 that may be employed by the processor 30 of the transaction data management system 12 to manage accessible transaction information that is available on the card. For example, the steps of the process 90 may be stored in memory 32, the storage 34 and/or the memory 58. Before proceeding, it should be noted that the process 90 described below is described as being performed by the processor 30 of the transaction data management system 12, but the process 90 may be performed by other suitable computing devices. Although described in a particular order, which represents a particular embodiment, it should be noted that the process 90 may be performed in any suitable order. Additionally, embodiments of the process 90 may omit process blocks and/or include additional process blocks.

Referring now to FIG. 7, at block 92, the processor 30 receives an indication of a modification to a group of cards corresponding to a user. For example, the indication may indicate that user desires to add a new card to the group of cards, remove one or more existing cards, edit information associated with one or more cards, or update a preference of cards.

At block 94, the processor 30 updates stored card information based on the indication. For example, if the indication indicates that a new card should be added to the stored card data, the processor 30 may add new card to the stored card data. As another nonlimiting example, if the indication indicates that a car should be removed from the stored card data, the processor 30 may remove the card from the stored card data. As another non-limiting example, if the indication indicates that a default card for executing transactions should be changed, the processor 30 my update the stored card data with a modified default card.

At block 96, the processor 30 transmits an indication of the updated stored card data. For example, the processor 30 may cause a display of the user device 16 to display notification indicating the update to the store card data, such as the new card added, the card removed, the updated default card, updated information of one or more transaction cards corresponding to the stored card data, and the like.

Accordingly, the process 90 may facilitate manage the transaction data management system 12 by providing techniques for a user to update information related to the stored card data.

As described herein, the transaction data management system 12 may also be implemented on a user device 16. For example, the transaction data management system 12 may be an application stored on a memory of a user device, such a smart phone or tablet, and executable by a processor of the user device 16. In such embodiments, the transaction data management system 12 may be configured to cause the display of the user device to display a graphical user interface (GUI) that enables the user to perform the operations described herein.

To illustrate this, FIG. 7 is a screenshot of a GUI 100 that may be displayed on a user device 16 to facilitate managing transaction authorization. For example, the GUI 100 may be used to manage a default credit card and information associated with one or more additional credits.

In the depicted embodiment, the GUI 100 includes a default card section 102 and a stored card library section 104. The default card section 102 generally stores information associated with a particular credit card (e.g., one of the cards 46, 48, and 50 as described with respect to FIG. 3). As illustrated, the default card section 102 displays a first card image 106, which corresponds to the default credit. Additionally, the default card section 104 includes a first selectable feature 108, which may be implemented as a soft button or other selectable feature that a user may select to perform a certain action. In this example, the first selectable feature 108 may enable a user to edit information associated with the default credit card corresponding to the first card image 106.

Further still, the stored card library section 104 displays images 110, 112, 114, and 116 each corresponding to a respective transaction card of the stored card data associated with a user. Additionally, the stored card library section 104 includes selectable features 118, 120, and 122 that a user may select to modify the stored card data as described with respect to FIG. 6. Furthermore, the stored card library section 116 may display alerts indicating certain information or alerts related to a particular transaction card. For example, the alert may indicate where a balance associated with the transaction card is within a threshold spending goal, beyond the spending goal, the card is about to expire, a potential fraudulent transaction has occurred, a statement balance is due, and the like.

Figure 8:
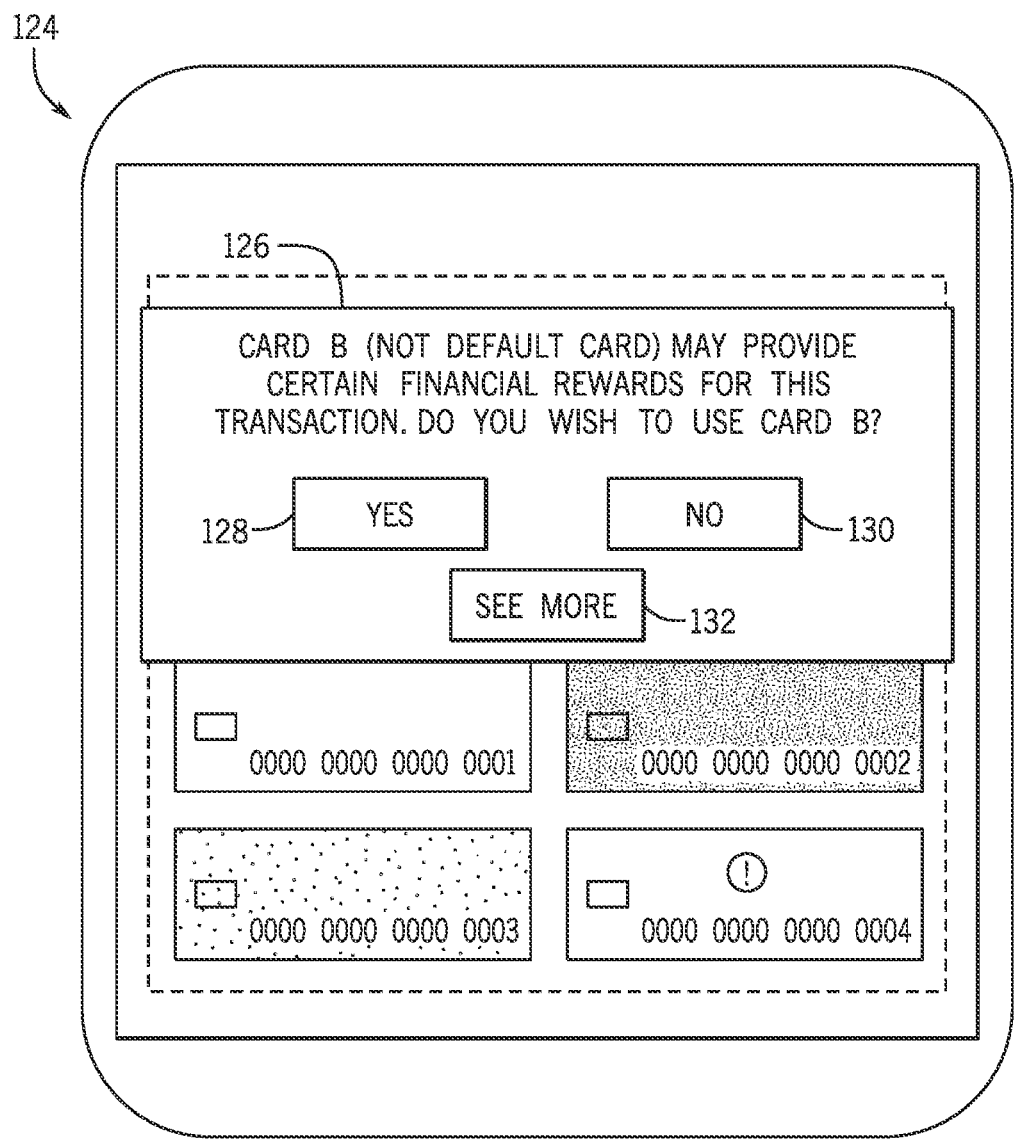
FIG. 8 illustrates a screenshot of a graphical user interface that notifies a user of a determined transaction card to use for a purchase, in accordance with embodiments describes herein.

As described herein, the transaction output may include a notification or recommendation of a selected card to use for executing a transaction. That is, the transaction output may cause a display of the user device to display the notification or recommendation. To illustrate this, FIG. 8 is a screenshot of a GUI 124 that may be displayed on the user device 16. In the depicted embodiment, the GUI 124 includes a notification window 126 that generally provides information related to a selected transaction card (e.g. as described above with respect to FIG. 4). As illustrated, the notification window 126 includes a first selectable feature 128 (e.g. a 'yes' button), a second selectable feature 130 (e.g., a 'no' button), and a third selectable feature 132 (e.g., a 'see more' button). In general, the first selectable feature 128 may cause the transaction data management system 12 to utilize the card selected by the processor 30 to execute a transaction. Alternatively, the second selectable feature 130 may cause the transaction dated management system 12 to select a different card or use a default card. Further still, the third selectable feature 132 may provide additional information, such as data indicating why a particular card was selected (e.g. certain financial benefits), that may aid a user in determining whether or not to use a card selected by the processor 30.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
a processor system comprising one or more processors;
communication circuitry configured to communicate with a retail transaction system;
a tangible, non-transitory, computer-readable medium, comprising instructions that are configured to cause the processor system to:
receive an indication of a potential transaction from the retail transaction system;
access stored card data from a memory, wherein the stored card data comprises a plurality of stored transaction cards associated with a user and authorization data associated with each of the plurality of stored transaction cards;
identify a first transaction card of the plurality of stored transaction cards;
receive user activity data for previous transactions by the user, wherein the user activity data corresponds to previous transactions by the user with a plurality of vendors, location data for the plurality of vendors, or both;
determine a second transaction card of the plurality of stored transaction cards based on the user activity data;
determine a first financial offering associated with the first transaction card;
determine a second financial offering associated with the second transaction card;
select the second transaction card of the plurality of stored transaction cards for executing the potential transaction based on the second financial offering being larger than the first financial offering;
output a control signal that causes a graphical user interface to display an image of the second transaction card;
generate a transaction output based on the second transaction card subsequent to outputting the control signal, wherein generating the transaction output comprises retrieving authorization data associated with the second transaction card to execute the potential transaction; and
instruct the communication circuitry to communicate the authorization data to the retail transaction system to automatically execute the potential transaction.

2. The system of claim 1, comprising a display configured to generate a graphical user interface (GUI) indicating one or more financial benefits associated with the second transaction card.

3. The system of claim 1, wherein the user activity data comprises location data indicating a location corresponding to the potential transaction.

4. The system of claim 1, wherein the user activity data comprises time data indicating a time period corresponding to the potential transaction.

5. The system of claim 1, wherein the plurality of stored transaction cards comprise account information that corresponds to a credit card, a debit card, a cash card, or a combination thereof.

6. The system of claim 1, wherein the instructions are configured to cause the processor to select the transaction card based on the user activity data by:
determining a time period corresponding to the activity data;
receiving user habit data indicating a vendor correlated with purchases during a time range;
determining that the time period is within the time range; and selecting the transaction card based on the time period being within the time range.

7. The system of claim 1, comprising a physical transaction card, wherein the physical transaction card comprises the processor.

8. The system of claim 1, wherein receive the indication of the potential transaction comprises detecting the retail transaction system.

9. The system of claim 1, wherein the instructions are configured to cause the processor to:
   receive an indication to update the stored card data associated with one of the plurality of stored transaction cards; and
   update the memory to update the stored card data associated with the one of the plurality of stored transaction cards based on the indication.

10. A method, comprising:
    storing card information for a plurality of cards in a first memory of a transaction card;
    determining a financial offering associated with each card of the plurality of cards;
    selecting an individual card of the plurality of cards based on the individual card having a largest financial offering available for a vendor and a recency of a statement period ending relative to other cards of the plurality of cards;
    storing the card information of the selected individual card in a second memory of the transaction card;
    displaying an indication of the selected individual card and a respective financial offering on a display of the transaction card;
    retrieving authorization data associated with the selected individual card to execute a next transaction, wherein the authorization data comprises an authorization code;
    storing the authorization data on the second memory of the transaction card; and
    automatically outputting the authorization data via the second memory to a terminal at the next transaction.

11. The method of claim 10, wherein selecting the individual card is based on:
    determining that the transaction card provides a financial benefit to a user; and
    selecting the transaction card in response to determining that the transaction card provides the financial benefit.

12. The method of claim 10, wherein the second memory is in a smart chip of the transaction card.

13. The method of claim 10, comprising erasing previously stored card information in the second memory.

14. The method of claim 10, wherein the second memory only stores card information for a single card.

15. The method of claim 10, wherein selecting the individual card is via a user input on the transaction card.

16. The method of claim 10, wherein selecting the individual card is via a mobile device.

17. A universal transaction card, comprising:
    a body;
    a display coupled to the body;
    a user input device coupled to the body;
    a first memory storing card information for a plurality of transaction cards;
    an integrated circuit chip coupled to the body and comprising a second memory configured to store card information for one of the plurality of transaction cards; and
    a processor configured to:
       determine a first transaction card for a potential transaction;
       determine a vendor corresponding to the potential transaction;
       identify a second transaction card based on the vendor;
       determine a first financial offering associated with the first transaction card;
       determine a second financial offering associated with the second transaction card;
       select the second transaction card of the plurality of transaction cards based on the second financial offering being larger than the first financial offering and a recency of a statement period ending associated with the first transaction card or the second transaction;
       store the card information for the second transaction card on the second memory of the integrated circuit chip; and
       generate instructions to use card information of the second transaction card in a next transaction and to display an indication of the second transaction card on the display, where in the instructions cause the processor to retrieve authorization data associated with the second transaction card to automatically execute the next transaction.

18. The universal transaction card of claim 17, wherein the instructions to use the card information of the second transaction card cause the integrated circuit chip to erase previously stored card information.

19. The universal transaction card of claim 17, comprising communication circuitry coupled to the body, wherein the communication circuitry is configured to communicate the instructions to a transaction data management system, wherein the transaction data management system is configured to generate an issuer script based on the instructions, and wherein the integrated circuit chip is configured to receive the issuer script in the next transaction from a chip reader and configured to store the card information or indicate that the card information is selected in the second memory.

20. The universal transaction card of claim 19, wherein the communication circuitry is configured to communicate the instructions from the communication circuitry indirectly and through a mobile device of a user or the chip reader.

* * * * *